(12) United States Patent
Tanner et al.

(10) Patent No.: US 11,220,609 B2
(45) Date of Patent: *Jan. 11, 2022

(54) NATURAL OIL BASED CLEANERS

(71) Applicant: Ethox Chemicals, LLC, Greenville, SC (US)

(72) Inventors: James T. Tanner, Greenville, SC (US); William C. Floyd, III, Greenville, SC (US)

(73) Assignee: Ethox Chemicals, LLC, Greenville, SC (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/816,164

(22) Filed: Nov. 17, 2017

(65) Prior Publication Data
US 2018/0072898 A1    Mar. 15, 2018

Related U.S. Application Data

(60) Division of application No. 15/175,155, filed on Jun. 7, 2016, now Pat. No. 10,781,322, which is a continuation-in-part of application No. 13/776,542, filed on Feb. 25, 2013, now Pat. No. 9,376,647, and a continuation-in-part of application No. 14/217,210, filed on Mar. 17, 2014, now abandoned.

(60) Provisional application No. 62/174,207, filed on Jun. 11, 2015, provisional application No. 61/786,719, filed on Mar. 15, 2013.

(51) Int. Cl.
| | | |
|---|---|---|
| C09D 9/00 | (2006.01) |
| C11D 7/26 | (2006.01) |
| C11D 7/32 | (2006.01) |
| C11D 3/20 | (2006.01) |
| C11D 3/18 | (2006.01) |
| C11C 3/00 | (2006.01) |
| C11C 3/04 | (2006.01) |
| C11B 9/00 | (2006.01) |
| C09D 7/43 | (2018.01) |

(52) U.S. Cl.
CPC ........... *C09D 9/005* (2013.01); *C09D 7/43* (2018.01); *C11B 9/00* (2013.01); *C11C 3/00* (2013.01); *C11C 3/04* (2013.01); *C11D 3/188* (2013.01); *C11D 3/2096* (2013.01); *C11D 7/267* (2013.01); *C11D 7/3209* (2013.01)

(58) Field of Classification Search
CPC ..................................................... C09D 9/005
See application file for complete search history.

(56) References Cited

U.S. PATENT DOCUMENTS

| | | | |
|---|---|---|---|
| 5,336,428 A | 8/1994 | Kaplan et al. | |
| 5,534,200 A | 7/1996 | Erilli et al. | |
| 6,939,839 B2 | 9/2005 | Johnson | |
| 10,781,322 B2 * | 9/2020 | Tanner | C11D 3/2096 |
| 2004/0185074 A1 * | 9/2004 | Faryniarz | A61K 8/0208 |
| | | | 424/401 |
| 2009/0065736 A1 | 3/2009 | Johnson | |
| 2009/0020944 A1 | 8/2009 | Lange | |
| 2009/0209441 A1 * | 8/2009 | Lange | C10M 159/12 |
| | | | 508/239 |
| 2014/0243549 A1 | 8/2014 | Tanner | |
| 2014/0275370 A1 | 9/2014 | Tanner | |

OTHER PUBLICATIONS

Brinksmeier et al., "Metalworking fluids—Mechanisms and performance", CIRP Annals—Manufacturing Technology, 2015, vol. 64, pp. 605-628 (Year: 2015).*

Arizona Chemical, Technical Disclosure "Clear Gelled Limonene Cleaner" IP 000215186.

* cited by examiner

*Primary Examiner* — Rei Tsang Shiao
(74) *Attorney, Agent, or Firm* — Joseph T. Guy; Patent Filing Specialist Inc.

(57) ABSTRACT

A composition suitable for cleaning hard surfaces comprising a natural oil solvent and a natural oil thickener is provided.

21 Claims, 2 Drawing Sheets

Triethanolamine reacted with Soybean oil Adduct**

R=Triglyceride Oil

NATURAL OIL BASED CLEANERS

CROSS-REFERENCE TO RELATED APPLICATIONS

This application is a divisional application of pending U.S. patent application Ser. No. 15/175,155 filed Jun. 7, 2016 which, in turn, claims the priority benefit under 35 U.S.C. section 119 of U.S. Provisional Patent Application No. 62/174,207 filed on Jun. 11, 2015 which is incorporated herein by reference. U.S. patent application Ser. No. 15/175,155 also claims priority, as a continuation-in-part application, to U.S. patent application Ser. No. 13/776,542 filed Feb. 25, 2013 now U.S. Pat. No. 9,376,647 issued Jun. 28, 2016 and as a continuation-in-part application to U.S. patent application Ser. No. 14/217,210 filed Mar. 17, 2014 which, in turn, claims priority to provisional application No. 61/786,719 filed Mar. 15, 2013 all of which are incorporated herein by reference.

FIELD OF THE INVENTION

The present invention is related to a natural oil based cleaner. More specifically, the present invention is related to a natural oil based cleaner comprising an oil and a natural oil based thickener.

BACKGROUND

The use of natural oils and their derivatives as solvents is increasing in many applications due to their availability as a renewable resource and their benign environmental properties. Natural oil solvents are a class of organic compounds known as terpenes which are derived from citrus fruits and trees. These include terpenes such as d-limonene and pinene which are known to possess good solvency characteristics and are relatively low in toxicity compared to solvents derived from petrochemical sources. Other natural oil derivatives, such as soy methyl ester, have been formulated into cleaning formulations for consumer and industrial applications. These non-toxic, biodegradable solvents are particularly desirable in cleaners used in oil field operations where large volumes of cleaning formulations are utilized and released into the environment.

Despite these advantages, there are drawbacks to their use in cleaning formulations. First, they are not water soluble and thus additional surfactants and additives must be incorporated in order to provide water rinsibility upon cleanup as described in U.S. Pat. No. 5,336,428 which is incorporated herein by reference. In addition, these added surfactants are often required at high levels and are often undesirable from an environmental standpoint. If the limonene or other natural oil solvent is to be provided in the form of an emulsion, it is often difficult to prepare stable emulsions or clear microemulsions with effective concentrations of the solvent.

Another disadvantage of natural oil solvents, particularly in cleaning large vertical surfaces such as tanks and oilrigs, is their low viscosity. This prevents them from remaining on the surface for sufficient time for their solvency to be effective. Attempts have been made to thicken or viscosify formulations containing natural oil solvents in order to increase their effectiveness. Synthetic copolymers have been used as additives to increase the viscosity as described in U.S. Pat. Nos. 5,336,428; 5,534,200 and Technical Disclosure "Clear Gelled Limonene Cleaner" Arizona Chemical, IP 000215186 all of which are incorporated herein by reference. However, these are often difficult to dissolve in the solvent requiring heat and agitation. The solvent and polymer must be heated and mixed until a clear homogeneous mixture is obtained and then cooled to obtain the thickened solvent and precise viscosity control is difficult. Furthermore, these synthetic copolymers are not desirable from an environmental standpoint and they are not water soluble.

Provided herein is an improved natural oil based cleaner comprising a natural oil solvent and a natural oil based thickener or dispersant for the solvent.

SUMMARY OF THE INVENTION

It is an object of the present invention to provide an environmentally friendly cleaning composition with improved solvency and rheological properties.

It is another object of the invention to provide an environmentally friendly composition suitable for cleaning hard surfaces which is readily obtained from inexpensive natural oils.

A particular feature of the invention is an increased viscosity wherein the viscosity enhancer also functions as a dispersant which increases the effectiveness of the cleaning composition.

These and other embodiments, as will be realized, are provided in a composition suitable for cleaning hard surfaces comprising a natural oil solvent and a natural oil thickener.

Yet another embodiment is provided in a method for cleaning a surface comprising:
providing a maleated natural oil;
combining the maleated natural oil with a natural oil solvent;
reacting the maleated natural oil with a tertiary amine thereby forming a composition;
applying the composition to the surface to form a used composition and a clean surface;
and removing the used composition from said surface.

DESCRIPTION

Figure 1:
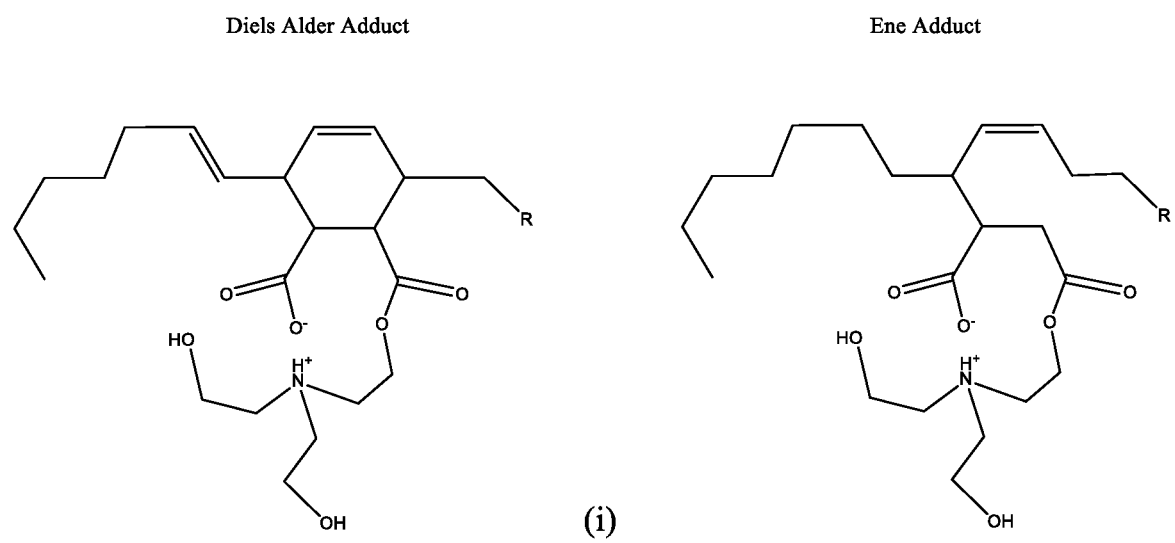
FIG. 1 is a schematic representation of an embodiment of the invention.

The present invention is related to a cleaning composition comprising a natural oil solvent, particularly terpenes or lower alkyl esters, with a natural oil based additive which increases viscosity and functions as a dispersant. A particularly preferred natural oil based additive is the reaction product of a maleated natural oil or fatty acid with, preferably, alkanol amines.

The invention will be described with reference to the figures forming an integral non-limiting element of the disclosure.

The compositions of the present invention are particularly suitable as hard surface cleaners. The composition comprises a natural oil solvent, a natural oil based thickener and optionally water and/or additional surfactant. While not limited to theory, the natural oil based thickener is also believed to function as an emulsifier and dispersant. The composition preferably comprises at 10 to about 80 wt % natural oil solvent and about 20 to about 50 wt % natural oil thickener with the balance being water.

The natural oil solvent is preferably selected from the terpene class of natural oils, derived from citrus oils or wood products, or lower alkyl ester derivatives of triglyceride fatty acids. Particularly suitable natural oil solvents include limonene and particularly D-limonene, soy methyl ester, pinene, tall oil methyl ester and lower alkyl esters, linseed oil methyl and lower alkyl esters, turpentine, *eucalyptus* oil, peppermint oil, tung oil and esters derived from tung oil. Non-naturally derived oils such as mineral oil and petroleum distillates may also be used.

The natural oil based thickener is a gelled, natural triglyceride oil such as soybean oil, linseed oil, safflower oil, sunflower oil, avocado oil, rapeseed oil, castor oil, tall oil, rosin oil and tung oil or a fatty acid such as corn oil, peanut oil, vegetable oils, fish oils or any unsaturated fatty acid of the corresponding triglyceride may also be used including oleic acid, linoleic acid and linolenic acid, all of which undergo an ene or diels alder reaction with maleic anhydride. Particularly suitable fatty acids are conjugated linoleic and linolenic acids sold under the Tradenames Pamolyn 200 and Pamolyn 380 by Eastman Chemical. While the triglyceride is the preferred embodiment of this composition, the di- and monoglycerides or mixed mono-, di-, and triglycerides of these oils may be used, or the fatty acids comprising them. The triglyceride has a preferred molecular weight of 500 to about 1500 and the fatty acid has a preferred molecular weight of about 150 to about 450. It is preferable that the natural oil used as the basis for the natural oil based thickener have a high level of saturation with at least 30-70% of the fatty acid chains being unsaturated and conjugatable wherein conjugatable chains comprise at least two alkenes which are either conjugated or can be reacted to form conjugated alkenes such as by the action of a catalyst or an Ene reaction. The gelation of these triglyceride oils and their properties has been disclosed by applicant in co-pending commonly assigned application U.S. Publ. Pat. Appl. No. 2014/0243549 entitled "Natural Oil Based Gels, Applications and Methods of Preparation" which is incorporated herein by reference. These triglyceride oil gels are the reaction products of a succinic anhydride derivative of the triglyceride and a base, the base being a metal hydroxide, or an amine, preferably an alkanolamine.

For the purposes of clarity the triglyceride or fatty acid will be abbreviated. Using a representation of soy bean oil as an example wherein that portion being derivatized is shown in brackets:

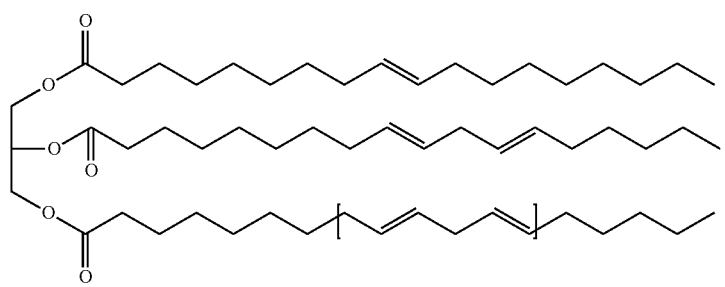

would be represented by the following:

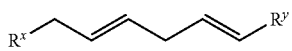

wherein Rx and Ry are those groups necessary to represent the two portions of the soy bean oil on either side of the derivatized portion. It would be understood that any conjugatable or conjugated alkenes could be represented in this manner. After conjugation and reaction with maleic anhydride, referred to herein as maleated natural oil, followed by further reaction with a tertiary amine having a formula:

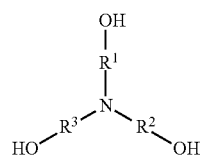

the product is a Diels Alder adduct represent by:

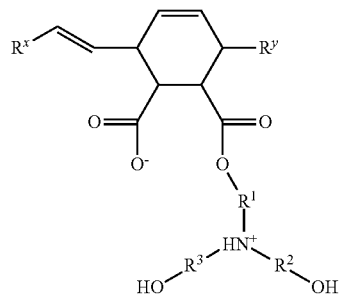

or the product after conjugation and reaction with maleic anhydride followed by further reaction with the tertiary amine is the Ene Adduct represent by:

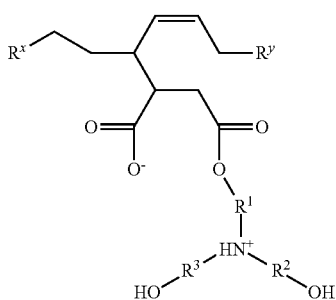

wherein:

$R^x$ and $R^y$ are as defined above to represent those groups necessary to represent the remaining groups of the natural oil used as the basis of the natural oil based thickener; $R^1$, $R^2$ and $R^3$ independently represent an alkyl or alkenyl of 1-5 carbons either unsubstituted or substituted with an alkyl of 1-5 carbons; —$(CH_2CHR^5O)_n$— wherein each $R^5$ independently is —H or —$CH_3$ and preferably —H and n is an integer of 1-100, preferably 10-100 and more preferably 10-70; or some combination thereof.

A particularly suitable natural oil based thickener useful in the present invention is the reaction product of a succinic anhydride functionalized soybean oil and triethanolamine illustrated in FIG. 1 wherein R is those groups necessary to represent the remaining elements of soybean oil.

The ionic functionality coupled with ester formation is hypothesized to result in ionomeric aggregation and gel formation. The natural oil based thickeners are soluble in a variety of natural oil solvents, particularly widely employed limonene and soy methyl ester, and can be used to provide thickened natural oil solvent formulations which are particularly suitable for cleaning. The composition is readily formed by an in situ gelation, wherein the maleated natural oil is first dissolved in the natural oil solvent followed by the addition of the tertiary amine. The advantage of this method over the prior art is that the components are readily soluble and no extended heating and agitation are required. The viscosity of the resulting solvent can also be precisely controlled by this method. Additionally, and most advantageously, the natural oil based thickener also functions as an emulsifier. The ionic functionality imparts water dispersibility thereby providing stable emulsions preferably comprising up to 60-70 wt percent of the natural oil based thickener and solvent can be readily obtained. Thus, the natural oil based thickener also functions as a very effective emulsifier for the solvent. This renders the addition of additional environmentally undesirable surfactants unnecessary in order to provide water solubility or rinsibility upon completion of the cleaning operation. In one embodiment there is no additional surfactant in the composition The natural oil based thickeners used in the compositions of the present invention also have the novel advantage of providing dispersability for oil, grease, pigments, and other substances during the cleaning process.

The compositions of the present invention may be anhydrous wherein they contain only solvent and thickener. In one embodiment the composition consist essentially of the natural oil solvent and the natural oil based thickener or any unreacted precursors thereof. It should be understood that the term "thickener" refers to the product obtained from the reaction of the maleated natural oil and the tertiary amine that is preferably formed in situ in the natural oil solvent. In this case the solvent and thickener form a clear homogeneous solution that has excellent solvency and readily "cleans up" or emulsifies when exposed to water. The viscosity of these solutions is readily controlled by the amount of thickener added. Depending on the desired viscosity, thickener is added from about 5 to about 50 wt %, and preferably from about 15 to about 30 wt %, based on the solvent, to yield clear anhydrous solutions.

The compositions of the present invention may also be microemulsions. These formulations include a natural oil solvent such as d-limonene, as well as the natural oil based thickener that allows the solvent to be emulsified into water. The thickener also includes an amine component that also assists in the removal or emulsification of oily residues. The formulation may also contain defoamers, stabilizers, or other surfactants. In this case water and additional surfactant is added to form clear viscous microemulsions. The additional surfactant also provides synergistic solvency to the formulation. Suitable surfactants include nonionic amine alkoxylates such as cocoamine reacted with two to ten moles of ethylene oxide, oleyl amine reacted with two to ten moles of ethylene oxide, tallow amine reacted with two to ten moles of ethylene oxide and the like. The preferred additional surfactants are cocamine reacted with five and six moles of ethylene oxide and will be referred to as CAM-5 and CAM-6 respectively. A particularly preferred surfactant is an amine containing from about 10 to about 22 carbon atoms and is reacted with about 6 moles of ethylene oxide.

It should be noted that this formulation can also be used in a low viscosity form as a cleaning agent of emulsifier, and that a high viscosity is not always necessary. For example, a composition comprising the thickener described herein mixed with between 5 and 50 wt percent, and preferably between 10 and 30 wt percent, of CAM-5 will produce a low viscosity formulation that has been found to be an unexpectedly effective cleaner for oil and grease deposits, and is also a highly effective emulsifier. If desired, water can be added from 1 to 50 wt percent, and more preferably from 15 to 25 wt percent, in order to increase the viscosity of the formulation. High and low viscosity cleaners, emulsifiers, and dispersants can be thus prepared.

The viscosity is preferably 400-10,000 cP. Below about 400 cP the composition tends to flow which decreases the cleaning ability and the amount of thickener is insufficient to function as an adequate dispersant. Above about 10,000 cP the composition is difficult to apply. The viscosity is more preferably about 1400 to about 8100 cP.

Figure 2:
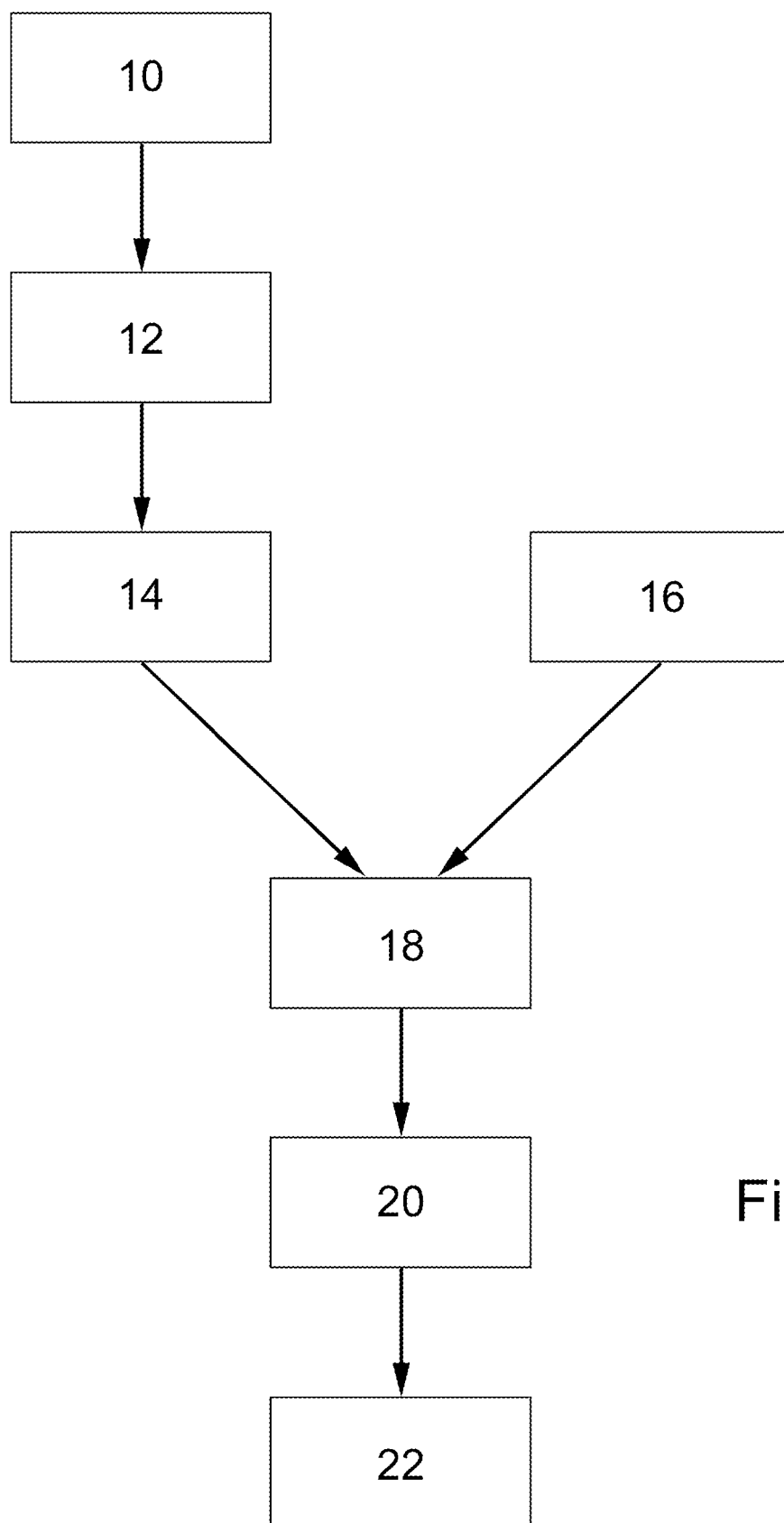
FIG. 2 is a flow-chart representation of an embodiment of the invention.

An embodiment of the invention will be described with reference to FIG. 2. In FIG. 2, a natural oil is provided at 10. The natural oil either comprises conjugated alkenes or is reacted to conjugate alkenes and then maleated at 12 thereby forming a maleated natural oil. The maleated natural oil is mixed with a natural oil solvent at 14 to provide a mixture. A base, preferably a tertiary amine, is provided at 16 and the base is mixed with the mixture at 18 and allowed to react to form the natural oil thickener in natural oil solvent. The natural oil thickener in solvent is applied to a surface at 20 and allowed to react with any dissolvable material coated thereon. The dissolvable material and natural oil thickener in solvent is removed from the surface at 22 preferably by washing with water.

EXAMPLES

The following examples are intended to demonstrate the usefulness of preferred embodiments of the present invention and should not be considered to limit its scope or applicability in any way.

Examples 1-6

In-Situ Gellation of d-Limonene and Soy Methyl Ester.

The compositions of Examples 1-6 in Table 1 were prepared by an in-situ gelation wherein a soybean oil maleic anhydride adduct, or maleated soybean oil, at a percent maleation of 23.0 percent was added to the limonene or soy methyl ester. One equivalent of triethanolamine was then added and the mixture was stirred until clear and homogenous. Exemplary clear solvent gels of any desired viscosity were obtained. In Table 1(%) is the percentage of soybean oil conjugated bonds maleated.

TABLE 1

Properties of d-Limonene and Soy methyl Ester Gels

| Ex. | Solvent | % | Clarity | Oil Bleed | Viscosity(cP) |
|---|---|---|---|---|---|
| 1 | D-Limonene | 15 | Transparent | None | 1500 |
| 2 | D-Limonene | 40 | Transparent | None | 6000 |
| 3 | D-Limonene | 20 | Transparent | None | 3000 |
| 4 | Soy Methyl Ester | 15 | Transparent | None | 3000 |
| 5 | Soy Methyl Ester | 40 | Transparent | None | 8000 |
| 6 | Soy Methyl Ester | 20 | Transparent | None | 4000 |

Example 7

This example demonstrates the enhanced solvency and effectiveness of compositions of the present invention in cleaning dried inks and pigments relative to 100 percent d-limonene. The composition of Example 1 effectively cleaned dried titanium dioxide and carbon black pigment from a painted white enamel surface. The composition of Example 1 also effectively cleaned dried black and red graphic inks from the surface. 100 percent d-limonene did not completely remove the pigments or the inks from the substrate. Furthermore, the composition of example 1 completely dispersed in water after cleaning leaving no residue.

Example 8

This example demonstrates the effectiveness of compositions of the present invention in cleaning vertical surfaces. A 12"×6" one quarter inch mild steel plate coated with an asphalt residue was clamped in a vertical position. The composition of Example 3 was applied to the plate and the plate was scrubbed with a sponge. The gelled limonene solution remained on the surface while 100 percent limonene had to be continually reapplied. Furthermore, the composition of example 3 completely dispersed in water after cleaning leaving no residue.

Example 9

A microemulsion was prepared from the following components. D-Limonene, 32%. Soy oil based thickener, 14%, CAM-6 surfactant, 15%, and Water, 39%. The soy oil based thickener formed in-situ in the d-limonene as previously described. When a clear homogeneous solution was obtained, water was added to produce a milky white emulsion. The CAM-6 surfactant was then added to produce a clear viscous microemulsion. Alternatively, CAM-6 could be added before addition of water. In this way a microemulsion was formed directly and without clouding at any point.

Example 10

This example demonstrates the effectiveness of the microemulsion of Example 9 in removing drilling mud residue from surfaces. A mixture comprising of 70% d-limonene containing 27% maleated soy bean oil, 25% CAM-5, and 5% DF-58 polysiloxane defoamer available from Air Products was emulsified in water at 3%. The foam head was found to have low height and dissipate rapidly. When this cloudy emulsion was added to a glass jar coated with simulated drilling mud and shaken by hand for two minutes, the walls of the jar were found to be completely clean.

In a comparative example, a mixture comprised of 65% ABSA (alkylbenzenesulfonic acid), 30% triethanolamine (TEA), and 5% DF-58 defoamer was dissolved in water at 3%. When this highly foamy solution was added to a glass jar coated with simulated drilling mud and shaken by hand for two minutes, the walls of the jar were found to still be significantly coated in oil residue.

In another example, a jar containing simulated drilling mud was treated only with the D-limonene containing maleated soy bean oil but not an amine. The drilling mud was found to be removed from the glass surface, but then redeposited elsewhere on the glass surface. This demonstrates the use of an amine in the surfactant formulation.

In another example, drilling mud mimic was coated onto a steel spatula. This spatula was then immersed in 500 mL of either of the above solutions inside a Warring blender stirring at approximately 2000 rpm. After one minute of being submerged in the treating solution, the spatula which had been immersed in the solution comprised of D-limonene and CAM-5 was substantially cleaner than the spatula treated with the ABSA-TEA solution The invention has been described with reference to the preferred embodiments without limit thereto. One of skill in the art would appreciate additional improvements and embodiments which are not specifically recited but are within the scope of invention as more specifically set forth in the claims appended hereto.

The invention claimed is:

1. A method for cleaning a surface comprising:
providing a maleated natural oil wherein said maleated natural oil is selected from the group consisting of maleated soybean oil, maleated linseed oil, maleated safflower oil, maleated sunflower oil, maleated avocado oil, maleated rapeseed oil, and maleated tung oil;
combining said maleated natural oil with a natural oil solvent selected from the group consisting of terpenes and lower alkyl ester derivatives of triglyceride fatty acids;
forming an ester of said maleated natural oil with a tertiary amine thereby forming a first composition wherein said first composition is anhydrous and said first composition comprises 10 to 80 wt % said natural oil solvent wherein said tertiary amine is defined by the formula:

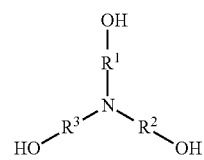

wherein:

R1, $R^2$ and $R^3$ independently represent an alkyl or alkenyl of 1-5 carbons either unsubstituted or substituted with an alkyl of 1-5 carbons; —$(CH_2CHR^5O)_n$— wherein each $R^5$ independently is —H or —$CH_3$ and n is an integer of 1-100; or some combination thereof;

applying said first composition to said surface as an anhydrous composition to form a used composition and a clean surface; and removing said used composition from said surface.

2. A method for cleaning a surface comprising:

providing a maleated natural oil wherein said maleated natural oil is selected from the group consisting of maleated soybean oil, maleated linseed oil, maleated safflower oil, maleated sunflower oil, maleated avocado oil, maleated rapeseed oil, and maleated tung oil;

combining said maleated natural oil with a natural oil solvent selected from the group consisting of terpenes and lower alkyl ester derivatives of triglyceride fatty acids;

forming an ester of said maleated natural oil with a tertiary amine thereby forming a first composition wherein said tertiary amine is defined by the formula:

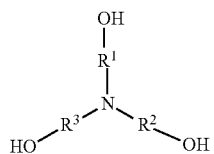

wherein:

R1, $R^2$ and $R^3$ independently represent an alkyl or alkenyl of 1-5 carbons either unsubstituted or substituted with an alkyl of 1-5 carbons; —$(CH_2CHR^5O)_n$— wherein each $R^5$ independently is —H or —$CH_3$ and n is an integer of 1-100; or some combination thereof;

applying said first composition to said surface as an anhydrous composition to form a used composition and a clean surface wherein said first composition comprises 20-50 wt % said ester of said maleated natural oil; and removing said used composition from said surface wherein said natural oil solvent is selected from the group consisting of limonene and soy methyl ester, pinene, tall oil methyl ester and lower alkyl esters, linseed oil methyl and lower alkyl esters, turpentine, *eucalyptus* oil, peppermint oil, and tung oil.

3. The method for cleaning a surface of claim 2 wherein said natural oil solvent is D-limonene.

4. The method for cleaning a surface of claim 1 wherein said maleated natural oil is a natural oil thickener.

5. A method for cleaning a surface comprising:

providing a maleated natural oil wherein said maleated natural oil is selected from the group consisting of maleated soybean oil, maleated linseed oil, maleated safflower oil, maleated sunflower oil, maleated avocado oil, maleated rapeseed oil, and maleated tung oil;

combining said maleated natural oil with a natural oil solvent selected from the group consisting of terpenes and lower alkyl ester derivatives of triglyceride fatty acids;

forming an ester of said maleated natural oil with a tertiary amine thereby forming a natural oil thickener in an anhydrous first composition wherein said anhydrous first composition comprises 10 to 80 wt % said natural oil solvent;

applying said anhydrous first composition to said surface to form a used composition and a clean surface; and removing said used composition from said surface wherein said tertiary amine is defined by the formula:

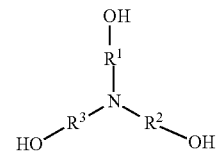

wherein:

R1, $R^2$ and $R^3$ independently represent an alkyl or alkenyl of 1-5 carbons either unsubstituted or substituted with an alkyl of 1-5 carbons; —$(CH_2CHR^5O)_n$— wherein each $R^5$ independently is —H or —$CH_3$ and n is an integer of 1-100; or some combination thereof.

6. The method for cleaning a surface of claim 5 wherein $R^5$ is —H.

7. The method for cleaning a surface of claim 5 wherein n is 10-100.

8. The method for cleaning a surface of claim 7 wherein n is 10-70.

9. A method for cleaning a surface comprising:

providing a maleated natural oil wherein said maleated natural oil is selected from the group consisting of maleated soybean oil, maleated linseed oil, maleated safflower oil, maleated sunflower oil, maleated avocado oil, maleated rapeseed oil, and maleated tung oil;

combining said maleated natural oil with a natural oil solvent selected from the group consisting of terpenes and lower alkyl ester derivatives of triglyceride fatty acids;

forming an ester of said maleated natural oil with a tertiary amine thereby forming a natural oil thickener in a composition wherein said composition comprises 10 to 80 wt % said natural oil solvent and said composition is anhydrous;

applying said composition to said surface to form a used composition and a clean surface; and removing said used composition from said surface wherein said natural oil thickener comprises at least one material selected from the group consisting of:

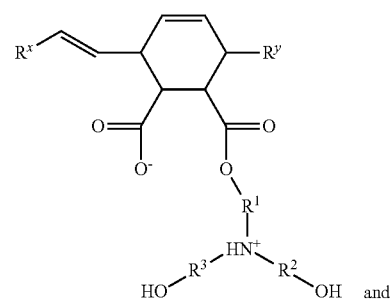

and

-continued

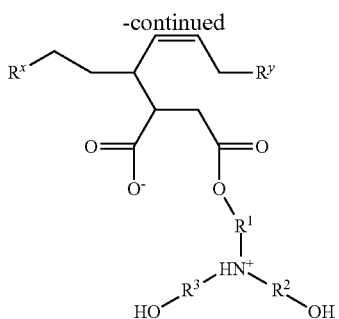

wherein:
$R^x$ and $R^y$ are the groups necessary to represent a natural oil;
R1, $R^2$ and $R^3$ independently represent an alkyl or alkenyl of 1-5 carbons either unsubstituted or substituted with an alkyl of 1-5 carbons; —$(CH_2CHR^5O)_n$— wherein each $R^5$ independently is —H or —$CH_3$ and n is an integer of 1-100; or some combination thereof.

10. The method for cleaning a surface of claim 9 wherein $R^5$ is —H.

11. The method for cleaning a surface of claim 9 wherein n is 10-100.

12. The method for cleaning a surface of claim 11 wherein n is 10-70.

13. The method for cleaning a surface of claim 9 wherein said natural oil solvent is a triglyceride oil.

14. The method for cleaning a surface of claim 13 wherein said natural oil solvent is selected from the group consisting of soybean oil, linseed oil, safflower oil, sunflower oil, avocado oil, rapeseed oil, and tung oil.

15. A method for cleaning a surface comprising:
providing a maleated natural oil wherein said maleated natural oil is selected from the group consisting of maleated soybean oil, maleated linseed oil, maleated safflower oil, maleated sunflower oil, maleated avocado oil, maleated rapeseed oil, and maleated tung oil;
combining said maleated natural oil with a natural oil solvent selected from the group consisting of terpenes and lower alkyl ester derivatives of triglyceride fatty acids;
forming an ester of said maleated natural oil with a tertiary amine thereby forming a first composition wherein said first composition is anhydrous wherein said tertiary amine is defined by the formula:

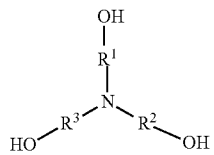

wherein:
R1, $R^2$ and $R^3$ independently represent an alkyl or alkenyl of 1-5 carbons either unsubstituted or substituted with an alkyl of 1-5 carbons; —$(CH_2CHR^5O)_n$— wherein each $R^5$ independently is —H or —$CH_3$ and n is an integer of 1-100; or some combination thereof;
applying said first composition to said surface to form a used composition and a clean surface; and
removing said used composition from said surface wherein said first composition comprises 20 to about 50 wt % said ester.

16. A method for cleaning a surface comprising:
providing a maleated natural oil wherein said natural oil is selected from the group consisting of maleated soybean oil, maleated linseed oil, maleated safflower oil, maleated sunflower oil, maleated avocado oil, maleated rapeseed oil, and maleated tung oil;
combining said maleated natural oil with a natural oil solvent selected from the group consisting of terpenes and lower alkyl ester derivatives of triglyceride fatty acids;
forming an ester of said maleated natural oil with a tertiary amine thereby forming an anhydrous first composition wherein said tertiary amine is defined by the formula:

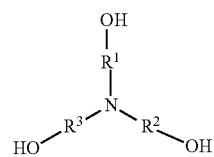

wherein:
R1, $R^2$ and $R^3$ independently represent an alkyl or alkenyl of 1-5 carbons either unsubstituted or substituted with an alkyl of 1-5 carbons; —$(CH_2CHR^5O)_n$— wherein each $R^5$ independently is —H or —$CH_3$ and n is an integer of 1-100; or some combination thereof;
applying said anhydrous first composition to said surface to form a used composition and a clean surface; and
removing said used composition from said surface.

17. A method for cleaning a surface comprising:
providing a maleated natural oil wherein said maleated natural oil is selected from the group consisting of maleated soybean oil, maleated linseed oil, maleated safflower oil, maleated sunflower oil, maleated avocado oil, maleated rapeseed oil, and maleated tung oil;
combining said maleated natural oil with a natural oil solvent selected from the group consisting of terpenes and lower alkyl ester derivatives of triglyceride fatty acids;
forming an ester of said maleated natural oil with a tertiary amine thereby forming an anhydrous first composition wherein said anhydrous first composition comprises 10 to 80 wt % said natural oil solvent wherein said tertiary amine is defined by the formula:

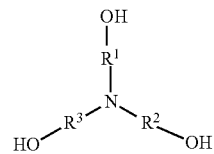

wherein:
R1, $R^2$ and $R^3$ independently represent an alkyl or alkenyl of 1-5 carbons either unsubstituted or substituted with an alkyl of 1-5 carbons; —$(CH_2CHR^5O)_n$— wherein each $R^5$ independently is —H or —$CH_3$ and n is an integer of 1-100; or some combination thereof;
applying said anhydrous first composition to said surface to form a used composition and a clean surface; and
removing said used composition from said surface wherein said first composition comprises 15-25 wt % water.

18. The method for cleaning a surface of claim 1 wherein said first composition further comprises a solvent.

19. A method for cleaning a surface comprising:
providing a maleated natural oil wherein said natural oil is selected from the group consisting of maleated soybean oil, maleated linseed oil, maleated safflower oil, maleated sunflower oil, maleated avocado oil, maleated rapeseed oil, and maleated tung oil;
combining said maleated natural oil with a natural oil solvent selected from the group consisting of terpenes and lower alkyl ester derivatives of triglyceride fatty acids;
forming an ester of said maleated natural oil with a tertiary amine thereby forming an anhydrous first composition wherein said tertiary amine is defined by the formula:

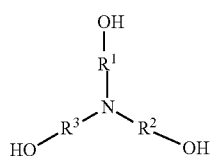

wherein:
R1, $R^2$ and $R^3$ independently represent an alkyl or alkenyl of 1-5 carbons either unsubstituted or substituted with an alkyl of 1-5 carbons; —$(CH_2CHR^5O)_n$— wherein each $R^5$ independently is —H or —$CH_3$ and n is an integer of 1-100; or some combination thereof;
applying said anhydrous first composition to said surface to form a used composition and a clean surface wherein said anhydrous first composition further comprises a solvent wherein said solvent is an amine containing from about 10 to about 22 carbon atoms and is reacted with about 6 moles of ethylene oxide; and
removing said used composition from said surface.

20. The method for cleaning a surface of claim 19 wherein said tertiary amine is cocoamine reacted with 6 moles of ethylene oxide.

21. A method for cleaning a surface comprising:
reacting a natural oil with maleic anhydride to form a Diels Alder adduct or Ene adduct of said natural oil comprising a carboxyl group wherein said Diels Alder adduct or Ene adduct of said maleated natural oil is selected from the group consisting of maleated soybean oil, maleated linseed oil, maleated safflower oil, maleated sunflower oil, maleated avocado oil, maleated rapeseed oil, and maleated tung oil;
combining said Diels Alder adduct or Ene adduct of said natural oil with a natural oil solvent selected from the group consisting of terpenes and lower alkyl ester derivatives of triglyceride fatty acids;
forming an ester of said Diels Alder adduct or Ene adduct of said natural oil with a tertiary amine wherein said tertiary amine forms said ester with said carboxyl group thereby forming an anhydrous first composition wherein said anhydrous first composition comprises 10 to 80 wt % said natural oil solvent wherein said tertiary amine is defined by the formula:

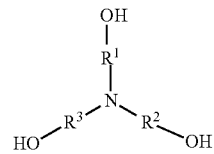

wherein:
R1, $R^2$ and $R^3$ independently represent an alkyl or alkenyl of 1-5 carbons either unsubstituted or substituted with an alkyl of 1-5 carbons; —$(CH_2CHR^5O)_n$— wherein each $R^5$ independently is —H or —$CH_3$ and n is an integer of 1-100; or some combination thereof;
applying said anhydrous first composition to said surface to form a used composition and a clean surface; and
removing said used composition from said surface.

* * * * *